United States Patent [19]
Gramckow

[11] Patent Number: 5,538,524
[45] Date of Patent: Jul. 23, 1996

[54] CROWNED ROW MOUND SOD PRODUCTION PROCESS

[75] Inventor: Martin Gramckow, Ojai, Calif.

[73] Assignee: Southland Sod Farms, Oxnard, Calif.

[21] Appl. No.: 215,269

[22] Filed: Mar. 21, 1994

[51] Int. Cl.⁶ .................................................. A01G 7/00
[52] U.S. Cl. ............................... 47/58; 47/DIG. 10
[58] Field of Search ................... 47/58, 56, 1 F, 47/665, DIG. 10

[56] References Cited

U.S. PATENT DOCUMENTS

| | | | |
|---|---|---|---|
| 197,102 | 11/1877 | Cornwall | 152/190 |
| 776,139 | 11/1904 | Luebben | 426/636 |
| 2,192,939 | 5/1937 | Slayter et al. | 47/1 |
| 2,605,589 | 11/1950 | Kuestner | 47/56 |
| 2,733,838 | 2/1956 | Neff | 222/142 |
| 2,876,588 | 3/1959 | Tietz et al. | 47/58 |
| 2,923,093 | 2/1960 | Allen | 47/56 |
| 3,080,681 | 3/1963 | Merrill et al. | 47/56 |
| 3,139,701 | 7/1964 | Nishuchi | 47/58 |
| 3,172,234 | 3/1965 | Eavis | 47/1.2 |
| 3,541,979 | 11/1970 | Lorenzen | 111/2 |
| 3,845,584 | 11/1974 | Mercer | 47/56 |
| 3,863,388 | 2/1975 | Loads | 47/56 |
| 3,867,250 | 2/1975 | Jankowiak et al. | 161/271 |
| 3,890,739 | 6/1975 | Blackburn | 47/56 |
| 3,903,816 | 9/1975 | Brem | 111/1 |
| 3,914,901 | 10/1975 | Muldner | 47/56 |
| 3,940,257 | 2/1976 | Sherwin et al. | 71/23 |
| 4,063,384 | 12/1977 | Warren et al. | 47/58 |
| 4,063,385 | 12/1977 | Friedberg | 47/58 |
| 4,066,490 | 1/1978 | Yoshimi | 156/276 |
| 4,067,716 | 1/1978 | Sterrett | 71/24 |
| 4,099,345 | 7/1978 | Loads | 47/56 |
| 4,154,174 | 5/1979 | Rees, Jr. et al. | 111/1 |
| 4,232,481 | 11/1980 | Chamouland | 47/56 |
| 4,268,993 | 5/1981 | Cunningham | 47/58 |
| 4,283,880 | 8/1981 | Fjeldsa | 47/56 |
| 4,297,810 | 11/1981 | Hansford | 47/9 |
| 4,309,844 | 1/1982 | King et al. | 47/56 |
| 4,336,668 | 6/1982 | Decker | 47/58 |
| 4,357,780 | 11/1982 | Ball | 47/56 |
| 4,364,197 | 12/1982 | Baron | 47/56 |
| 4,369,597 | 1/1983 | Leep et al. | 47/9 |
| 4,414,776 | 11/1983 | Ball | 47/56 |
| 4,424,645 | 1/1984 | Rannali | 47/66 |
| 4,716,679 | 1/1988 | Heard | 47/56 |

FOREIGN PATENT DOCUMENTS 2200828  8/1988  United Kingdom .

*Primary Examiner*—Douglas W. Robinson
*Assistant Examiner*—Elizabeth F. McElwain
*Attorney, Agent, or Firm*—Kelly Bauersfeld & Lowry

[57] ABSTRACT

A barrier grown sod production process is provided for use in growing healthy barrier grown sod on a large-scale. The process includes growing seeded growth media on a moisture impervious plastic sheet which is placed over crowned row mounds. Trenches between the row mounds may also be lined with the plastic sheet. Crowning of the row mound aids in controlled drainage of excess water, thereby keeping the ground soil dry for vehicle access and for maintaining the critical salinity/moisture content/oxygenation/fertility balance necessary for producing healthy barrier grown sod.

11 Claims, 1 Drawing Sheet

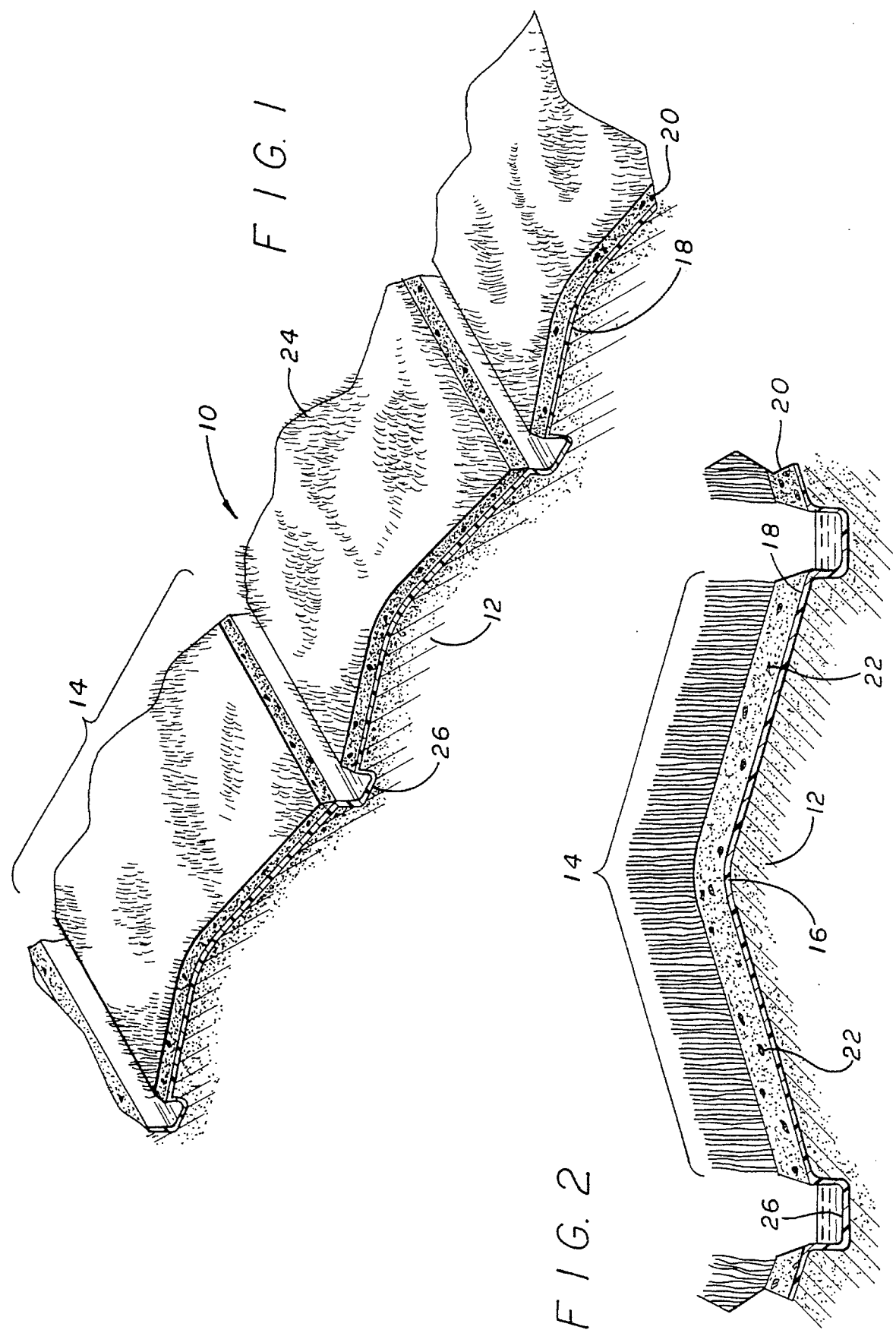

CROWNED ROW MOUND SOD PRODUCTION PROCESS

FIELD OF THE INVENTION

This invention relates generally to commercial barrier grown sod production. More specifically, this invention relates to a crowned row mound sod production process.

BACKGROUND OF THE INVENTION

Grass lawns are now commonly produced by growing sod in large fields at special sod farms. The fields are prepared in a similar manner to vegetable farming with special attention given to the final grade. The grass seed is sown using a mechanical seeder and is then irrigated for germination. Once germinated, the sod is systematically irrigated, mowed and weeded for a minimum of five months and up to a year or more before a harvestable crop is established. The sod is then mechanically cut into strips containing approximately ⅝ths of an inch of top soil. The strips are then folded or rolled and finally stacked onto pallets for shipping via truck.

Barrier grown sod has evolved into a viable alternative to field grown sod. Using this method, sod is produced by placing a thin plastic barrier over the field and laying a mixture of growth media and seed over the plastic. The plastic acts as a barrier to vertical root development, forcing lateral growth which reduces production time. Because the organic growth media is significantly lighter than soil, the product has the additional potential of reducing trucking and installation costs. See, e.g., U.S. Pat. No. 4,720,935 to Rogers et al. Finally barrier grown sod does not result in the reduction of top soil.

The production of barrier grown sod requires precise control of the root zone environment. There are serious agronomic and logistical issues that must be resolved in order to effectively produce barrier grown sod on a large scale. Because barrier grown sod has a root zone hundreds of times smaller than traditional field grown sod, conditions such as salinity, oxygenation, moisture content, and fertility must be carefully controlled for healthy sod production. Furthermore, local conditions such as water quality and growing media complicate the growers' ability to maintain a balanced and healthy environment. A change in the system to resolve an imbalance in any one of the factors will affect the remaining factors. For example, frequent irrigation to maintain optimum moisture content can result in salinity buildup. Alternatively, the use of a fine particle media for moisture retention reduces the media's ability to hold oxygen necessary for healthy root development, Therefore, when producing barrier grown sod, it is essential to regulate the drainage of excess water and to leach out salts that may result from fertilizer breakdown. The common approach used to resolve the drainage requirement is to perforate the plastic barrier. Chamoulaud, U.S. Pat. No. 4,232,481 uses such a perforated plastic sheet on a substantially flat surface to allow for drainage. The primary deficiency of this approach however, is that the soil beneath the barrier becomes wet and muddy from drainage water which seeps through the holes. Unless the producer has access to high drainage sandy soil, the fields will soften and eventually be unable to adequately support the weight of a mower or other equipment.

Others have used a plastic sheet impervious to moisture. For example, U.K. Patent Application 2,200828A to Buller describes such use of an impervious plastic sheet on level and flat ground with edging batons combined with drainage channels between the row mounds to drain away excess water. The edging batons and flat growing surface however, limit its drainage potential. Therefor, this approach can only be successfully applied in areas with access to low salinity irrigation water and/or significant rainfall.

Accordingly, there exists a need for a commercial barrier grown sod production method that allows for good drainage control. There is a further need for a method which permits watering the sod, but ensures that the soil beneath the plastic barrier remains substantially dry and solid, in order to support working vehicles. There is also a need for a method that effectively balances salinity, oxygenation, moisture content and fertility, even when using less than ideal irrigation water and growing media. The present invention fulfills these needs and provides further related advantages.

SUMMARY OF THE INVENTION

According to the present invention and exemplary embodiment thereof described herein, a crowned row mound sod production process is provided for growing healthy barrier grown sod on a large scale. The process generally comprises preparing ground soil in the form of crowned row mounds, placing a substantially moisture impervious plastic sheet over the row mounds, and uniformly spreading a growth medium on the plastic sheet, the growth medium mixed with at least one type of grass seed. Trenches between the row mounds may also be lined with the plastic sheet.

In a preferred embodiment, the row mounds are approximately 20 feet wide and prepared to have a pitched configuration with a crown (i.e. the highest point). The crown extends longitudinally down the row mound and establishes the upper edge of a slope having a "rise to run" ratio of no less than 2.5:100.

Any suitable substantially moisture impervious plastic sheet may be used. Similarly, the growth media and grass seed are of the type generally well known.

Other features and advantages of the present invention will become apparent from the following more detailed description of the accompanying drawings which illustrate, by way of example, the principles of the invention.

BRIEF DESCRIPTION OF THE DRAWINGS

The accompanying drawings illustrate the invention. In such drawings:

FIG. 1 is a perspective view of barrier grown sod produced from the process embodying the novel features of the invention; and FIG. 2 is a fragmented vertical sectional view of the sod of FIG. 1

DETAILED DESCRIPTION OF THE PREFERRED EMBODIMENT

As shown in the drawings for purposes of illustration, an improved method of producing barrier grown sod as illustrated in FIG. 1 by the reference number 10 is provided for growing healthy barrier grown sod on a large scale. The method is specifically designed to aid in controlled drainage of excess salts, and in balancing such health-contributing factors as salinity, moisture-content, oxygenation and fertility, even when using less than ideal irrigation water and growing media.

In accordance with the present invention, and as illustrated with respect to a preferred embodiment in FIGS. 1 and 2, the crowned row mound sod production process generally comprises preparing ground soil 12 in the form of row mounds 14 having a pitched configuration with a crown 16, placing a substantially moisture impervious plastic sheet 18 over the row mounds 14, and uniformly spreading a growth medium 20 over the plastic sheet 18, the growth medium mixed with at least one type of grass seed 22 from which grass 24 is produced. Each of the row mounds is separated by a trench 26 extending longitudinally therebetween.

The ground soil 12 is prepared in approximately 20 feet wide row mounds 14 using conventional means. These longitudinal row mounds extend throughout the field. The row mounds 14 are formed with a pitched configuration such that the highest point forms the crown 16. In the preferred embodiment shown in FIGS. 1 and 2, the crown extends longitudinally down the center of the row mound establishing the highest edge of the slope having a rise to run ratio of no less than 2.5:100. The crown may also be off-center.

Any suitable moisture impervious plastic sheet may be used. The plastic sheet 18 may also be used to line the trenches 26.

The primary purpose of the trenches is to drain the irrigation leachate off of the field. In addition, they provide a location for the irrigation sprinkler lines and act as drainage channels for excess rainfall or irrigation. The choice of growth medium 20 is heavily cost driven and therefor varies among locations. Finally, the preferred grass seed 22 used is determined by the local market demand for sod variety.

The present invention has the ability to compensate for salinity through controlled leaching. Faced with poor water quality and limited sandy soil, the present invention relies exclusively on lateral leaching. Excess salinity is moved laterally through the growth media to the trenches. The water flows laterally through the growth media on top of the row mounds and into the master drainage system without interruption. There are no curbs, edging batons, etc. which may otherwise hinder free drainage to the trenches. The soil beneath the plastic sheet remains dry and solid, eliminating the need for high drainage sandy soils.

An additional benefit of this process is its ability to adjust for local conditions including, local water quality, climate, and special turf variety requirements. For example, if the local irrigation water has a high total dissolved salt content (TDS), the slope pitch can be increased for a higher leaching potential. Similarly, the pitch can be increased to adjust for a growing media with a high salt content or to increase the media's aeration. When conditions are generally favorable, the pitch is lowered to ease irrigation management. In summary, the moisture/aeration balance of the media and the leaching potential of the row mound can be adjusted to accommodate the requirements of a particular sod variety, growing media, and local conditions.

The crowned row mound system of the present invention provides the ability to produce barrier grown sod with marginal quality water, on loam fields, using an inexpensive growing media.

Although a particular embodiment of the invention has been described in detail for purposes of illustration, various modifications may be made without departing from the spirit and scope of the invention. Accordingly, the invention is not to be limited, except as by the appended claims.

What is claimed is:

1. A process of producing barrier grown sod, comprising:

preparing ground soil in the form of row mounds having a pitched configuration with an elevated crown wherein each of the row mounds is separated by a trench;

placing a substantially moisture impervious plastic sheet over the row mounds; and spreading a growth medium over the plastic sheet, the growth medium mixed with at least one type of grass seed from which sod is produced.

2. The process according to claim 1, wherein the trenches are lined with the substantially moisture impervious plastic sheet.

3. The process according to claim 1, wherein the row mounds are about 20 feet wide.

4. The process according to claim 1, wherein the crown establishes the highest edge of a slope having a rise to run ratio of no less than 2.5:100.

5. The process according to claim 1, wherein the crown is at the center of the row mound and the rise to run ratio is no less than 2.5:100.

6. A process of producing barrier grown sod, comprising:

preparing ground soil in the form of row mounds separated from each other by a trench extending longitudinally therebetween, the row mounds having a pitched configuration and a crown, the crown establishing the highest edge of a slope having a rise to run ratio of no less than 2.5:100;

placing a substantially moisture impervious plastic sheet over the row mounds; and uniformly spreading a growth medium over the plastic sheet, the growth medium mixed with at least one type of grass seed from which sod is produced.

7. The process according to claim 6, wherein the trenches are lined with the substantially moisture impervious plastic sheet.

8. The process according to claim 6, wherein the row mounds are about 20 feet wide.

9. In a method of producing barrier grown sod by using a growth medium mixed with at least one type of grass seed on top of an impervious plastic sheet and watering the grass seed to effect germination, the improvement comprising:

placing the plastic sheet over a row mound formed from ground soil prepared with a pitched configuration and a crown in the center of the row mound, the crown permitting excess water to be laterally led off to a trench longitudinally extending between each row mound, the trench lined with the impervious plastic sheet.

10. The process according to claim 9, wherein the row mounds are about 20 feet wide.

11. The process according to claim 9, wherein the crown establishes the highest edge of a slope having a rise to run ratio of no less than 2.5:100.

* * * * *